US008991420B2

(12) United States Patent
Adams et al.

(10) Patent No.: US 8,991,420 B2
(45) Date of Patent: Mar. 31, 2015

(54) NON-RISING STEM ACTUATOR

(71) Applicant: GE Oil & Gas Pressure Control LP, Houston, TX (US)

(72) Inventors: Keith M. Adams, Katy, TX (US); Lloyd R. Cheatham, Lake Jackson, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 0 days.

(21) Appl. No.: 14/107,589

(22) Filed: Dec. 16, 2013

(65) Prior Publication Data

US 2014/0137960 A1    May 22, 2014

Related U.S. Application Data

(63) Continuation-in-part of application No. 13/832,884, filed on Mar. 15, 2013, which is a continuation-in-part of application No. 13/679,653, filed on Nov. 16, 2012.

(60) Provisional application No. 61/747,753, filed on Dec. 31, 2012, provisional application No. 61/747,479, filed on Dec. 31, 2012.

(51) Int. Cl.
*F16K 37/00* (2006.01)
*F16K 31/122* (2006.01)

(52) U.S. Cl.
CPC .......... *F16K 31/1221* (2013.01); *F16K 37/0008* (2013.01)
USPC .......... 137/556; 137/551; 137/553; 251/61.4; 251/62; 251/63.6; 251/291

(58) Field of Classification Search
CPC ............ F16K 31/1221; F16K 31/1262; F16K 37/0008; F16K 37/0016; F16K 37/0083
USPC .......... 137/551, 553, 556; 251/61, 61.1, 61.2, 251/61.4, 61.5, 62, 63, 63.5, 63.6, 291
See application file for complete search history.

(56) References Cited

U.S. PATENT DOCUMENTS 2,610,820 A   9/1952  Markel
3,139,898 A   7/1964  Wiltgen
(Continued)

FOREIGN PATENT DOCUMENTS

EP    0416966 A2   3/1991
EP    0486824 A1   5/1992
(Continued)

OTHER PUBLICATIONS

PCT Search Report and Written Opinion dated Mar. 7, 2014 issued in connection with corresponding PCT Application No. PCT/US2013/077392.

*Primary Examiner* — Matthew W Jellett
(74) *Attorney, Agent, or Firm* — Bracewell & Giuliani LLP

(57) ABSTRACT

An apparatus for actuating a valve includes a housing having an axis, a valve end, a cap end, and a cylindrical sidewall defining an inner diameter surface of the housing. A cap is connected to the cap end of the housing. An inlet is located in one of the cap and the housing. A plate is positioned within the housing, the plate having an outer diameter that slidingly engages the inner diameter surface of the housing. The plate moves between an extended position and a retracted position in response to pressure media from the inlet. A down stop is in contact with the plate. A seal nut has a first end in engagement with the down stop. The seal nut has a second end with an end surface, the end surface being spaced apart from the cap when the plate is in the extended position.

19 Claims, 5 Drawing Sheets

(56) References Cited

U.S. PATENT DOCUMENTS

| | | | |
|---|---|---|---|
| 3,146,682 A | 9/1964 | Price et al. | |
| 3,293,992 A | 12/1966 | Baumann | |
| 3,380,470 A | 4/1968 | Culpepper, Jr. et al. | |
| 3,792,717 A | 2/1974 | Tibbals | |
| 3,881,400 A | 5/1975 | Lewis | |
| 3,958,592 A | 5/1976 | Wells | |
| 3,993,284 A | 11/1976 | Lukens | |
| 4,135,546 A | 1/1979 | Morrison | |
| 4,135,547 A | 1/1979 | Akkerman | |
| 4,187,764 A | 2/1980 | Cho | |
| 4,354,425 A | 10/1982 | Bruton | |
| 4,424,738 A | 1/1984 | Leighton | |
| 4,480,811 A | 11/1984 | Card | |
| 4,489,756 A | 12/1984 | Balz | |
| 4,491,060 A | 1/1985 | Boski | |
| 4,527,769 A | 7/1985 | Stogner | |
| 4,529,330 A | 7/1985 | Boski | |
| 4,585,207 A | 4/1986 | Shelton | |
| 4,633,898 A | 1/1987 | Denk | |
| 4,721,284 A * | 1/1988 | Bankard | 251/86 |
| 4,768,545 A | 9/1988 | Hoffman | |
| 4,967,785 A | 11/1990 | Young | |
| 5,067,392 A | 11/1991 | Gautier | |
| 5,294,090 A * | 3/1994 | Winnike | 251/36 |
| 6,050,541 A | 4/2000 | Chatufale | |
| 6,089,531 A | 7/2000 | Young | |
| 6,397,892 B1 | 6/2002 | Pyle et al. | |
| 6,672,331 B2 | 1/2004 | Heald | |
| 7,124,774 B2 * | 10/2006 | Weingarten | 137/514.7 |
| 8,322,359 B2 * | 12/2012 | Zecchi et al. | 137/15.18 |
| 8,708,309 B2 * | 4/2014 | Roper et al. | 251/337 |
| 2007/0290154 A1 | 12/2007 | Aoyama et al. | |
| 2012/0227983 A1 | 9/2012 | Lymberopoulos et al. | |

FOREIGN PATENT DOCUMENTS

| | | |
|---|---|---|
| GB | 2022704 A | 12/1979 |
| GB | 2168787 | 6/1986 |
| GB | 2303199 A | 2/1997 |

* cited by examiner

US 8,991,420 B2

NON-RISING STEM ACTUATOR

CROSS REFERENCE TO RELATED APPLICATIONS

This application claims priority to and the benefit of U.S. Provisional Application No. 61/747,753, titled "Non-Rising Stem Actuator," filed Dec. 31, 2012, the full disclosure of which is hereby incorporated by reference herein in its entirety.

This application also is a continuation-in-part of and claims priority to and the benefit of: U.S. patent application Ser. No. 13/679,553, titled "Combination Diaphragm Piston Actuator," filed Nov. 16, 2012; and U.S. patent application Ser. No. 13/832,884, titled "Quick Connect Valve Actuator," which claims priority to and the benefit of U.S. Provisional Patent Application No. 61/747,479, titled "Quick Connect Valve Actuator," filed Dec. 31, 2012, the full disclosure of each which are incorporated herein by reference in its entirety.

BACKGROUND OF THE DISCLOSURE

1. Field of the Invention

The present disclosure relates in general to valves for mineral recovery wells, and in particular to actuators to actuate valves.

2. Description of Related Art

A gate valve is a valve having a body and a bore through the body. A gate is positioned transverse to the body, and moves linearly to obstruct flow through the bore or allow flow through the bore. Some gates have an aperture that aligns with the bore to allow flow. The gate can be normally open, and thus the gate is closed when it is moved linearly to push the aperture out of alignment with the bore. Alternatively, a gate can be normally closed, and thus the gate is opened when it is moved linearly to position the aperture in alignment with the bore. Regardless of whether the gate is normally open or normally closed, the gate is moved, or actuated, by a valve actuator.

Actuators can be a hydraulic, piston type actuator, or actuators can be a pneumatic piston or diaphragm type actuator. In conventional diaphragm actuators, a diaphragm is moved in response to pressure media, such as gas or other fluids, urging the diaphragm toward the gate valve. The diaphragm is supported by a support plate. When the diaphragm is urged downward with the pressure media, it urges the support plate downward, which then transfers the downward force via a stem to the gate of the gate valve to open or close the gate valve, as applicable. In current diaphragm actuators a top shaft extends through an opening in the top or cap of the actuator and provides a visual position indication to show if the gate valve is open or closed or in an intermediate position between open and closed. However, actuator failure can be caused by a damaged top shaft. This can happen, for example from improper handling, during shipping, tools being dropped on the top shaft, or from service operations. A damaged top shaft can in turn damage the seals that seal the top shaft to the inner surface of the opening in the cap of the actuator, affecting whether the seals can contain the pressure of the pressure media as designed. This is particularly true if corrosive fluids are used or if the valve is located in a harsh environment.

SUMMARY OF THE DISCLOSURE

Systems and methods of this current disclosure provide a non-rising stem diaphragm or piston actuator. This actuator does not have a top shaft that protrudes through the cap of the actuator. An indicator shaft is instead provided that protrudes from a non-pressure containing portion of the actuator, reducing the risk of seal failures. In addition, systems and methods of the current disclosure include an indicator shaft that can limit removal of the actuator while the actuator is pressurized with pressure media.

In an embodiment of the current disclosure, an apparatus for actuating a valve includes a housing having an axis, valve end, a cap end, and a cylindrical sidewall defining an inner diameter surface of the housing. A cap is connected to the cap end of the housing. An inlet is located in one of the cap and the housing. A plate is positioned within the housing, the plate having a center portion and an outer diameter that slidingly engages the inner diameter surface of the housing. The plate moves between an extended position and a retracted position in response to pressure media from the inlet, the plate being nearer the valve end in the extended position than in the retracted position. A down stop is in contact with the plate, the down stop being urged toward the valve end of the housing when the plate moves toward the extended position. The down stop can be connected to a valve stem for actuating the valve. A seal nut has a first end in engagement with the down stop. The seal nut has a second end with an end surface, the end surface being spaced apart from the cap when the plate is in the extended position.

In another embodiment of the current disclosure, an apparatus for actuating a valve includes a housing having an axis, a valve end, a cap end, and a cylindrical sidewall defining an inner diameter surface of the housing. A plate is positioned within the housing, the plate moving between an extended position and a retracted position in response to pressure media applied within the housing on a pressure side of the plate. The plate is nearer the valve end in the extended position than in the retracted position. A pressure chamber is located between the cap and the pressure side of the plate. An indicator stem protrudes from the housing and is located axially offset from the axis of the housing, the indicator stem selectively engaging an indicator side of the plate that is opposite the pressure side of the plate. The indicator stem moves between a plate-up position and a plate-down position in response to movement of the plate between the extended position and the retracted position.

In yet another embodiment of the current disclosure, an apparatus for actuating a valve includes a housing having an axis, a valve end, a cap end, and a cylindrical sidewall defining an inner diameter surface of the housing. A plate is positioned within the housing, the plate moving between an extended position and a retracted position in response to pressure media applied within the housing on a pressure side of the plate. The plate is nearer the valve end in the extended position than in the retracted position. A bonnet is detachably connected to the housing and operable to be connected to the valve. A latch body is connected to the housing, the latch body selectively preventing the housing from rotating relative to the bonnet when the latch body is in a latched position. An orifice in a surface of the housing is located proximate to the valve end of the housing and axially offset from the axis of the housing. An indicator stem protrudes through the orifice, the indicator stem having a first end in engagement with a surface of the plate facing the valve end of the housing and a second end located exterior of the housing radially outward from and axially aligned with the rotational lock, relative to an axis of the housing, when the plate is in the extended position. The indicator stem prevents the latch body from moving to an unlatched position when the indicator stem is in the plate-down position.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

DETAILED DESCRIPTION OF THE DISCLOSURE

The system and method of the present disclosure will now be described more fully hereinafter with reference to the accompanying drawings which illustrate embodiments of the invention. The system and method if this disclosure may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

Figure 1:
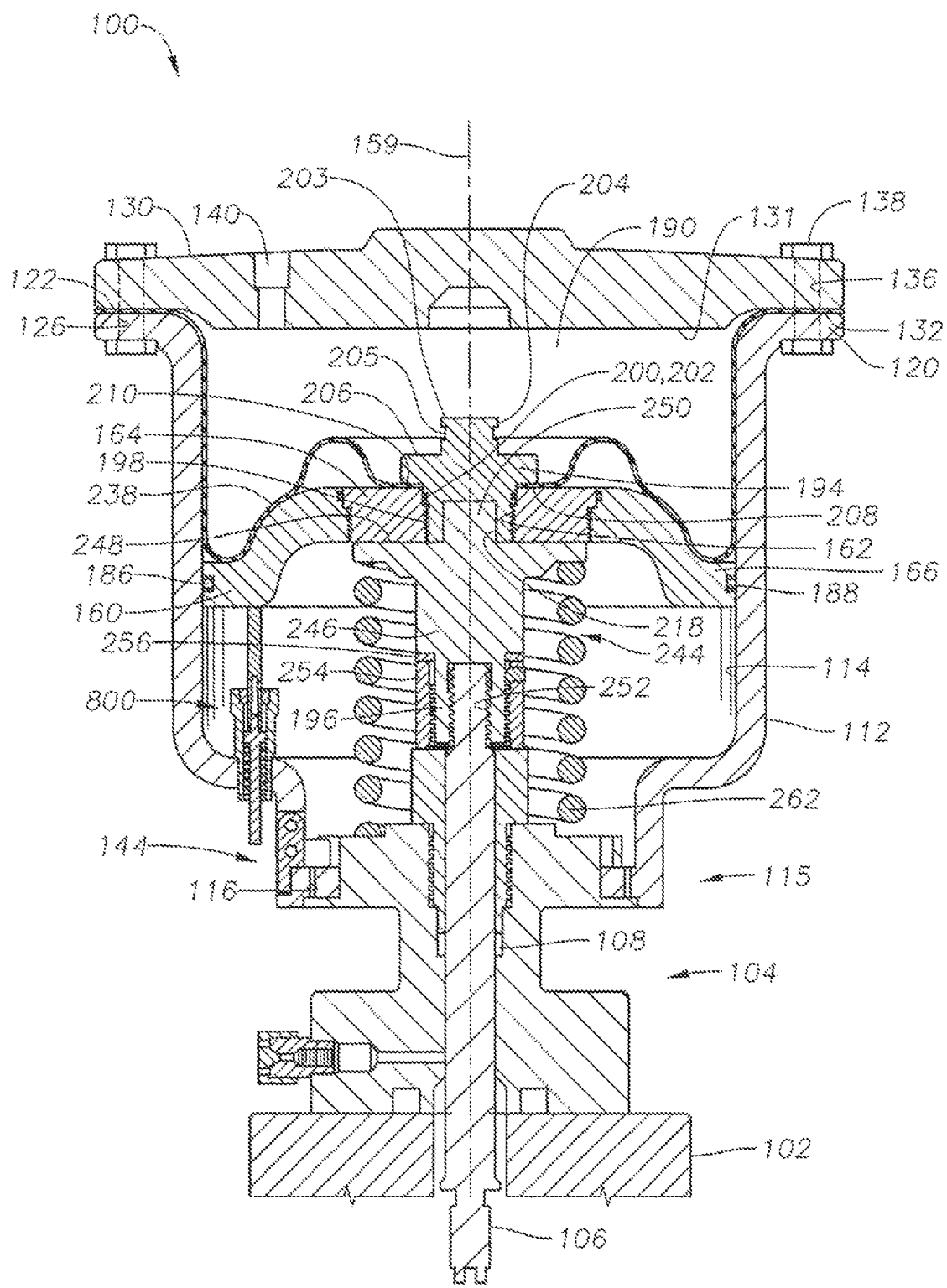
FIG. 1 is a side sectional environmental view of an embodiment of a diaphragm actuator with a non-rising stem diaphragm shown in the plate-down position.

Referring to FIG. 1, actuator 100 is shown. Actuator 100 is used to open or close valve 102, to which actuator 100 is connected. As one of skill in the art will appreciate, valve 102 can be a gate valve or any other type of valve that is actuated by the extension of a linear member. Valve 102 can be, for example associated with a wellhead assembly that is disposed over a well. The wellhead assembly can include a wellhead housing, a production tree over the housing and flow lines connected to the tree or the wellhead assembly. The flow lines and wellhead assembly can include embodiments of valve 102 described herein. Valve 102 can also be used for regulating fluids that are designated for entry into the wellhead assembly. Valve 102 can be used in low temperature or otherwise harsh environments. Bonnet 104 is connected to the body of valve 102. Valve stem 106 passes through bonnet 104 and packing retainer 108. Actuator 100 is used to actuate valve 102 by urging valve stem 106 downward toward valve 102.

Actuator housing 112 includes a cylindrical body having an inner diameter ("ID") surface 114. Housing 112 is manufactured from any of a variety of techniques including, for example, stamping, extrusion, and casting. In embodiments, housing 112 is free of welds or seams on interior surfaces such as ID surface 114. Housing 112 can be manufactured from NACE certified materials.

A valve end of actuator housing 112 is connected to bonnet 104 by way of connector 115. Connector 115 is shown as a quick-connect connection, but other types of connectors can be used including, for example, bolts or a threaded connection. Looking at FIGS. 4-5, the lower end of housing 112 includes an opening defined by inner diameter 116. Housing lugs 118 protrude inward from inner diameter 116 and are spaced apart around inner diameter 116 to define slots 119 therebetween. Bonnet 104 and valve 102 prevent the flow of fluid from valve 102 to actuator 100. In embodiments, actuator housing 112 can be removed from bonnet 104 while fluid is present in valve 102 and no fluid will flow out of valve 102 through bonnet 104 or otherwise.

Bonnet 104 includes lower flange 121 extending radially from bonnet body 124. Lower flange 121 includes bolt holes 123. Bolts 128 pass through bolt holes 123 to connect bonnet 104 to the body of valve 102. At the opposite end of bonnet 104 from lower flange 121, locking flange 125 extends radially from bonnet body 124 and includes top surface 127. The outer diameter of locking flange 125 is less than or about equal to the inner diameter 116 such that inner diameter 116 can fit over locking flange 125.

Groove 134 is an annular groove in the outer diameter of locking flange 125. The lower side wall of groove 134 defines upward facing shoulder 135. The width of groove 134, which is defined in terms of axial length along the axis of bonnet 104, is greater than or about equal to the axial length of housing lugs 118. The diameter of groove back wall 139 is less than or about equal to the inner diameter defined by housing lugs 118.

Slots 141 are axial slots in the outer diameter of locking flange 125 that extend from top surface 127 to groove 134. A plurality of slots 141 are spaced apart around the circumference of locking flange 125 to define bonnet lugs 142 therebetween. The radial depth of each slot 141 is typically less than or equal to the radial depth of groove 134, but can be greater than the radial depth of groove 134. The circumferential arc length of each slot 141 is approximately equal to or greater than the circumferential arc length of housing lugs 118. Housing lugs 118, thus, are able to pass axially through slots 141. After passing through slots 141, housing lugs 118 are positioned in groove 134 below bonnet lugs 142, but not axially aligned with bonnet lugs 142, in a released position. Housing lugs 118 contact shoulder 135, thus stopping further downward movement of housing 112 relative to bonnet 104. Because housing lugs 118 are axially below bonnet lugs 142, housing 112 can rotate relative to bonnet 104. When housing 112 rotates, relative to bonnet 104, to a position wherein bonnet lugs 142 are axially above housing lugs 118, housing 112 is in a locked position. In the locked position, bonnet lugs 142 prevent upward axial movement of housing lugs 118. In embodiments, less than one revolution of housing 112 is required to move housing 112 from the released to the locked position. In certain embodiments, housing 112 can move as little as ½, ⅓, ¼, ⅙, ⅛, 1/10, or 1/16, of a revolution, depending on the size and number of lugs, to move from the released to the locked position. As one of skill in the art will appreciate, no fluid from valve 102 is in the vicinity of bonnet lugs 142 and housing lugs 118 and, thus, there can be an absence of seals between the lower end of housing 112 and the upper end of bonnet 104. Therefore, in embodiments, if any fluid is present inside the lower end of housing 112, at least a portion of that fluid can pass through the opening defined by inner diameter 116 and flow to the area outside of housing 112 and outside of bonnet 104.

Figure 5:
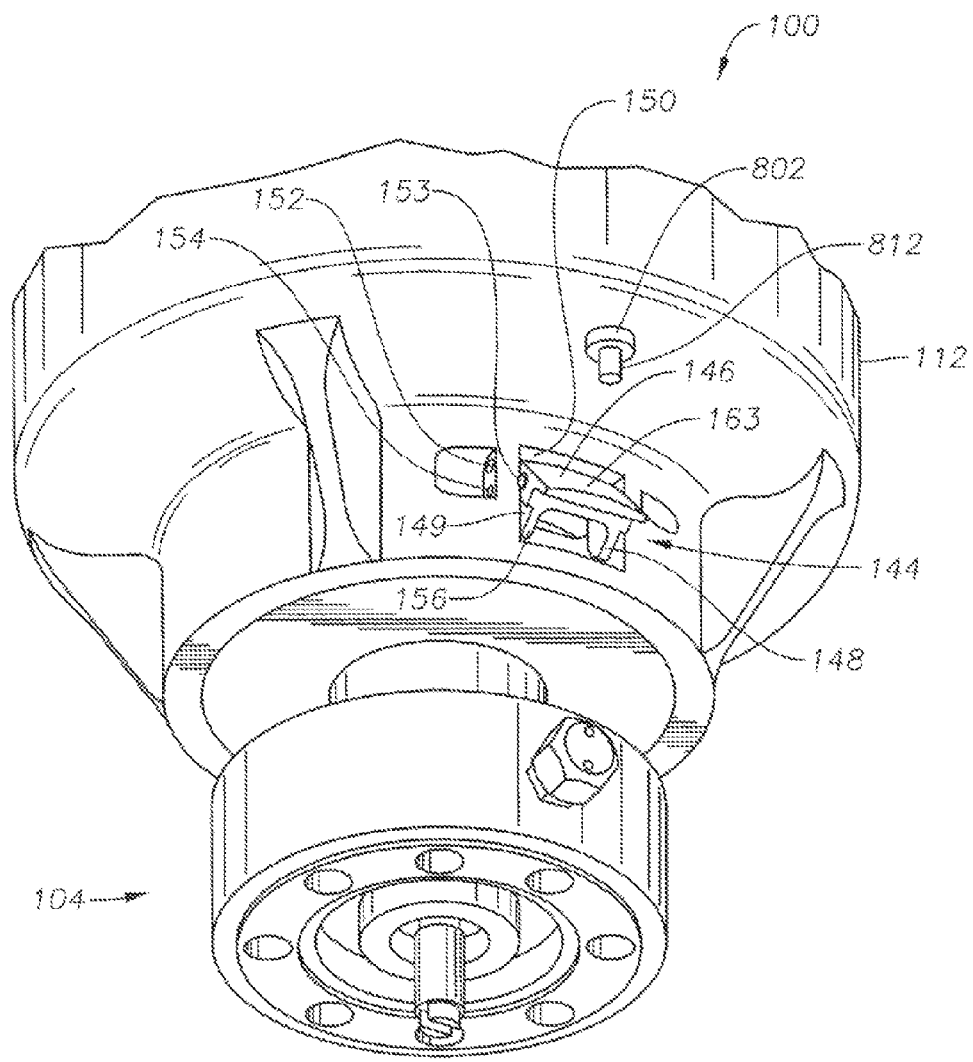
FIG. 5 is an enlarged view of the rotational lock of the valve actuator of FIG. 1 shown in the plate-up position.

Referring to FIG. 5, a rotational lock 144 can prevent rotation of housing 112, relative to bonnet 104, when housing 112 is in the locked position. Rotational lock 144 includes latch body 146 having one or more latch tabs 148 protruding inward therefrom when latch body is positioned in latch aperture 150. Latch aperture 150 is an opening through the sidewall of housing 112. In embodiments, no seals are required at aperture 150 because there is an absence of pressurized fluid in housing 112 proximate to aperture 150. Indeed, in embodiments, there is an absence of seals between aperture 150 and latch body 146. Latch body 146 is pivotally connected to housing 112 by pin 152, which passes through a lateral bore, or cross-drilled hole, of body 112. Latch body 146 pivots on pin 152 between an unlatched position and a latched position. Detent 153 is a spring loaded plunger that protrudes from one or both sides of latch body 146. Detent 153 engages lateral bore 154 of body 112 to selectively prevent latch body 146 from pivoting relative to housing 112. When latch body 146 is pivoted radially outward from housing 112, in the unlatched position, detent 153 contacts an outer diameter surface of housing 112 to prevent latch body 146 from pivoting inward to the latched position. As one of skill in the art will appreciate, other mechanisms can be used to hold latch body 146 in place. Latch tab 148 also includes tab sidewalls 149. Latch tab 148 is positioned in housing 112 slightly above housing lugs 118, such that at least a portion of latch tab 148 is in the same axial location as bonnet lugs 142 when housing 112 is landed on bonnet 104.

In embodiments, a spring (not shown) can bias latch body 146 radially inward. A portion of latch tab 148, such as bottom 156, contacts a top edge (not shown in FIG. 5) of bonnet lug 142 when housing 112 is placed on bonnet 104, thus deflecting latch tab 148 radially outward. An edge of bottom 156 can have a taper to facilitate such deflection.

Figure 4:
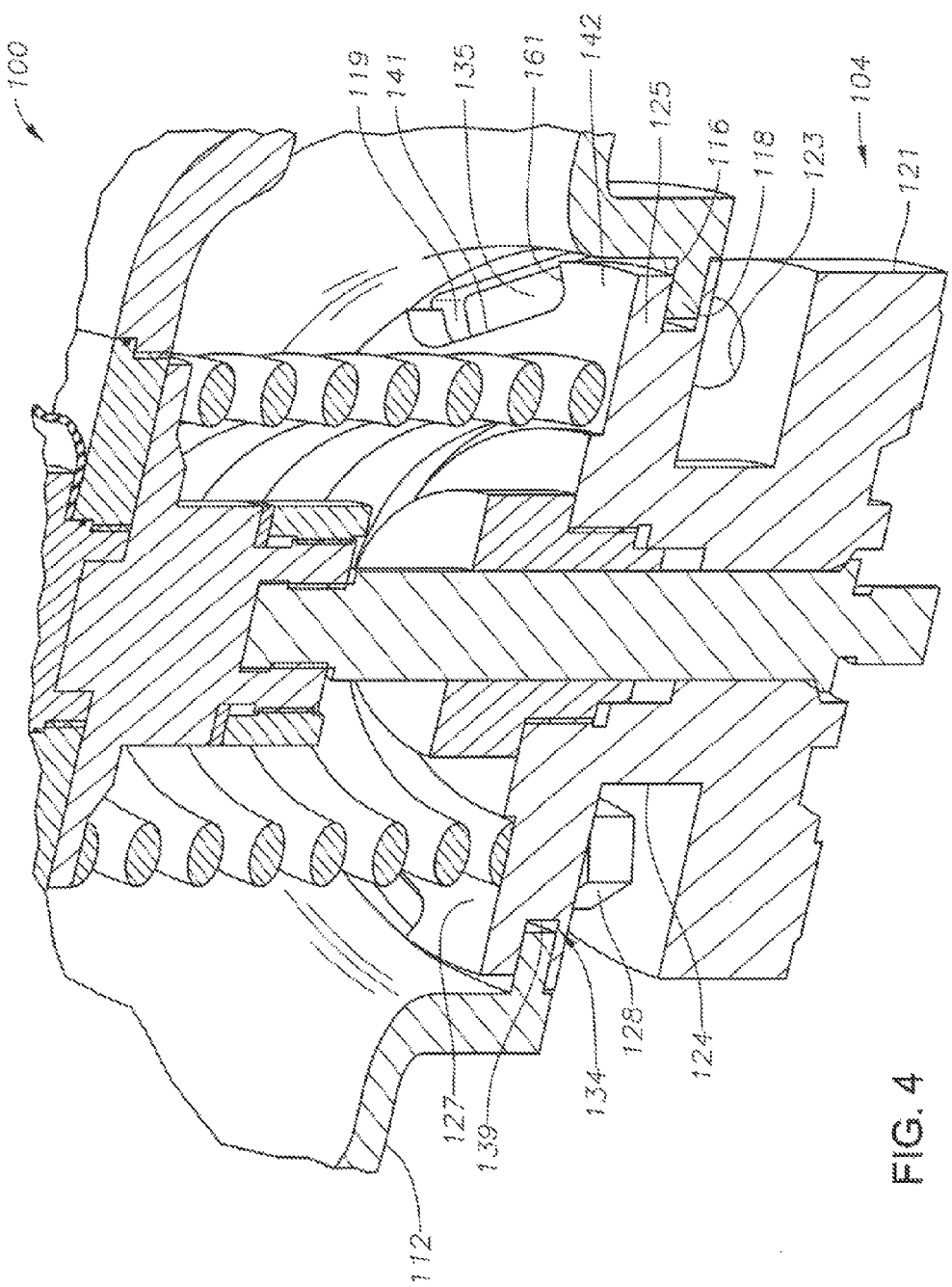
FIG. 4 is an enlarged view of the quick connect of the valve actuator of FIG. 1.

Referring to FIGS. 4-5, with latch tab 148 positioned radially outward from housing 112, in the unlatched position, housing lugs 118 land on shoulder 135 and housing 112 is rotated to the locked position. Detent 153 holds latch tab 148 in the radially outward, unlatched position. An operator then depresses detent 153 to allow latch tab 148 to pivot inward to the latched position. When latch tab 148 pivots to a position where detent 153 is aligned with lateral bore 154, a portion of detent 153 is urged by the internal spring (not shown) into lateral bore 154. In this latched position, detent 153 engages lateral bore 154 to hold latch tab 148 in the latched position and thus prevent latch tab 148 from moving to the unlatched position. In the latched position, latch tab sidewalls 149 engage the sidewalls 161 of bonnet lugs 142, thus preventing further rotation of housing 112 in either direction relative to bonnet 104. The outer surface 163 of latch tab 148 can be contoured with a radius that generally matches the outer diameter profile of housing 112. Alternatively, the outer surface 163 of latch tab 148 can be planar. Other types of rotational lock 144 can be used. For example, a pin (not shown) can be inserted through an aperture (not shown) of housing 112 into a bore (not shown) of bonnet 104. Or a different type of latch mechanism can be used.

Looking again at FIG. 1, a cap end of housing 112 is at the opposite end of housing 112, from connector 115. A flange 120 is located at the cap end of housing 112. Flange 120 flares outward from housing 112. Flange 120 has an upward facing surface 122, which is a smooth surface for forming a seal. A plurality of bolt holes 126 are spaced part around flange 120.

Cap 130 is connected to housing 112. Cap 130 is an annular plate having an outer diameter approximately equal to the outer diameter of flange 120. Sealing surface 132 is a generally smooth, downward racing surface of cap 130 that aligns with upward facing surface 122 of flange 120. A plurality of bolt holes 136 are spaced apart around cap 130 to align with bolt holes 126. Cap bolts 138 are passed through bolt holes 136 and bolt holes 126 and are secured with nuts. Other configurations can be used to secure cap 130 to housing 112, such as bolts that are inserted through bolt holes 136 to threadingly engage bolt holes 126 to secure cap 130 to housing 112 (not shown), bolts that are inserted through bolt holes 126 to threadingly engage bolt holes 136 (not shown), clamps (not shown), or collars (not shown).

Inlet 140 is an orifice through cap 130 and is spaced inwardly from sealing surface 132. Inlet 140 is connected to a pressurized media fluid source (not shown) that can selectively provide pressurized media fluid through inlet 140. Pressurized media is typically a fluid such as compressed air, nitrogen, well gas, or other types of gas or liquid. As one of skill in the art will appreciate, in embodiments, additional orifices can be used and can be connected to tubing or pressure relief devices.

Plate 160 is an annular plate positioned in housing 112. Plate 160 is generally perpendicular to the axis 159 of housing 112. Plate 160 can span the inner diameter of housing 112 and slidingly or sealingly engage the inner diameter surface of housing 112. Plate 160 includes a central bore 162. Alternatively, plate 160 can span a portion of the inner diameter of housing 112 but not extend to the inner diameter surface of housing 112. The upward facing surface of plate 160 is the pressure side of plate 160. The surface of plate 160 can have a contour such that the radially outward portions are axially below the radially inward portions, or such that the radially outward portions are axially above the radially inward portions (not shown). In other embodiments, the surface of plate 160 can be flat. As shown in FIG. 1, the outer diameter region of the plate is located axially nearer the valve end of the housing than the central portion of the plate. In embodiments, plate 160 has an upward facing convex surface and an upward facing concave surface. The concave surface can be spaced radially outward from the convex surface or alternatively, radially inward from the convex surface. In other embodiments, plate 160 can have a generally flat surface or can have a combination of contoured convex, concave, or flat portions.

Figure 3:
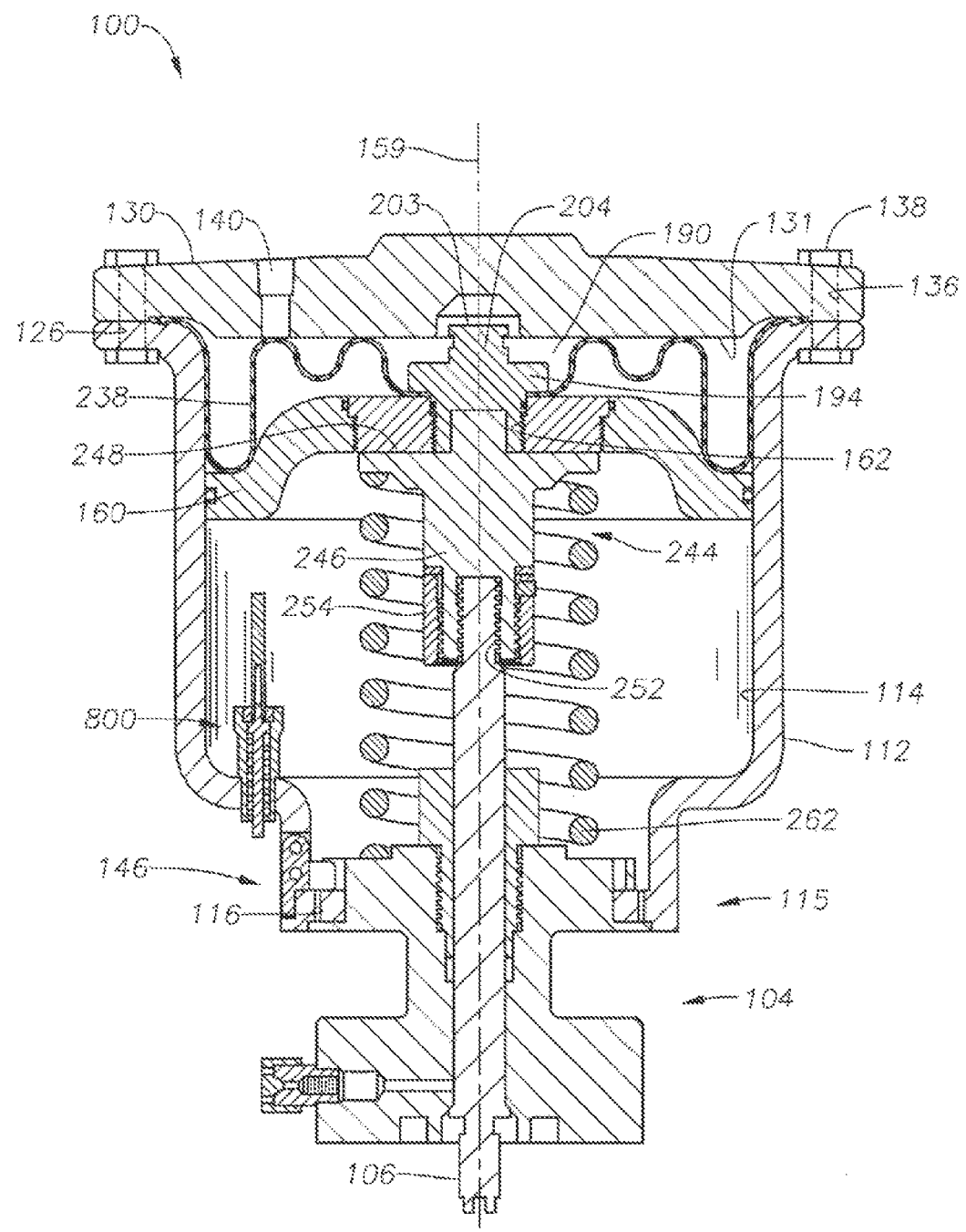
FIG. 3 is a side sectional view of the embodiment of FIG. 1, shown in the plate-up position.

Plate 160 can be a single, monolithic plate, or, as shown in FIGS. 1 and 3, can include hub 164 and outer plate 166. Hub 164 includes central bore 162, having ID threads on the ID surface. Hub 164 also includes a sealing surface on an ID of central bore 162. The outer diameter of hub 164 includes outer diameter ("OD") threads and an OD sealing surface.

Outer plate 166 is an annular ring that connects to hub 164, such that plate 160 includes outer plate 166 and hub 164. The upper surface of outer plate 166 slopes downward and outward, with a generally convex shape, and then extends horizontally to ID surface 114. In other embodiments, the upper surface of outer plate 166 can slope upward and outward before extending horizontally to ID surface 114, or can be a flat surface, or can have an alternative shape of a combination sloped and flat portions. The ID bore of outer plate 166 includes ID threads for threadingly engaging the OD threads of hub 164. An annular seal can form a seal between outer plate 166 and hub 164. Sidewall seal 186 is positioned in groove 188 located on an outer diameter of outer plate 166, and thus is located on an outer diameter of plate 160. Sidewall seal 186 sealingly engages ID surface 114 of housing 112 to provide a dynamic seal between ID surface 114 and plate 160. In embodiments, a wear ring (not shown in FIG. 1) can be positioned in groove 188. As one of skill in the art will appreciate, a wear ring will reduce the friction between the outer diameter of plate 160 and ID surface 114 of housing 112. The wear ring (not shown in FIG. 1) does not have the same sealing properties as sidewall seal 186.

The space bounded by housing 112, plate 160, and cap 130 is defined as a pressure chamber 190. Fluid introduced through inlet 140 results in an increase in pressure, which causes plate 160 to move downward.

Seal nut 194 is detachably connected to the center of plate 160. Seal nut 194 includes a cylindrical body 196. Threads 198 are on an outer diameter of body 196, and threadingly engage the ID threads of hub 164. Seal nut 194 includes a seal 200, positioned in a seal groove 202 on an OD surface of body 196 axially above threads 198, to sealingly engage central bore 162 of hub 164. Alternatively, there can be an absence of seals between body 196 and the inner diameter of plate 160.

Upper body 204 is a cylindrical portion of seal nut 194 on the end opposite of threads 198. Upper body 204 has an end surface 203. End surface 203 can be proximate to or engage an inner surface 131 of cap 130 when plate 160 is in an upper position. Inner surface 131 is circumscribed by ID surface 114 of actuator housing 112. A radial groove 205 can be located on an outer diameter of upper body 204. Shoulder 206 is a shoulder that extends radially from an outer diameter of body 196 of seal nut 194. Shoulder 206 is located axially above seal groove 202. The outer diameter of shoulder 206 is greater than the inner diameter of bore 162 so that shoulder 206 radially overlaps a portion of the upward facing surface of plate 160. Shoulder 206 includes downward facing surface 208, which faces towards plate 160 when seal nut 194 is installed in plate 160. Lip 210 protrudes axially downward from surface 208, near the edge of shoulder 206.

In embodiments, an orifice (not shown) can be located in the center of cap 130. The orifice (not shown) can be plugged with a relief device (not shown) to prevent pressurized media from escaping through the orifice (not shown). In the event an operator desires to use an upward rising indicator stem that can be used, for example, to urge plate 160 downward, the plug (not shown) can be removed and an indicator stem housing (not shown) can be inserted into the orifice (not shown) in cap 130. An indicator stem can be connected to plate 160 such as, for example, by connecting a stem (not shown) to seal nut 140 by way of groove 205. The indicator stem housing (not shown) can slidingly and sealingly engage the stem (not shown).

Diaphragm 238 is a flexible diaphragm extending at least from ID surface 114 to seal nut 194. As shown in FIG. 1, diaphragm 238 is positioned between sealing surface 132 of cap 130 and surface 122 of flange 120. In one design, bolt hole openings can be spaced apart around diaphragm 238, in alignment with cap bolts 138, so that cap bolts 138 pass through diaphragm 238 when it is positioned between cap 130 and flange 120. Cap bolts 138 are torqued to urge each sealing surface toward diaphragm 238. Diaphragm 238, thus, acts as a seal by sealingly engaging each of the sealing surfaces 132, 122. In an alternative embodiment, as shown in FIG. 3, the diaphragm 238 can have a protruding lip that engages a sealing groove in flange 120 to hold diaphragm 238 in place An inner diameter orifice is located at the center of diaphragm 238. The lower portion of seal nut 194 passes through that orifice to engage the threads of central bore 162 and down stop 244. The surfaces of diaphragm 238 are positioned between shoulder 206 of seal nut 194 and plate 160. As shown in FIGS. 1 and 3, an upward facing surface of hub 164 sealingly engages a lower surface of diaphragm 238, and the downward facing surface 208 of shoulder 206 sealingly engages an upper surface of diaphragm 238. As seal nut 194 is tightened toward plate 160, diaphragm 238 is compressed between them plate 160 and shoulder 206. Lip 210 is pressed into diaphragm 238 to further engage diaphragm 238 and resist radial movement of diaphragm 238 relative to plate 160. When diaphragm 238 is in position, pressure chamber 190 is defined by diaphragm 238 and cap 130.

In one embodiment, diaphragm 238 is fully supported by plate 100 and housing 112. In particular, a solid member is in contact with substantially all of diaphragm 238 such that the solid members prevent diaphragm 238 from ballooning outward in response to pressure media. Plate 160 supports the underside of diaphragm 238 across the entire inner diameter of housing 112 over both the convex and concave surfaces of plate 160. The ID surface 114 of housing 112 supports the sides of diaphragm 238. When pressure media in pressure chamber 190 exerts force against diaphragm 238 and plate 160 is in the down position, there is an absence of unsupported areas of diaphragm 238. The portion of diaphragm 238 that is inward from ID surface 114 is supported by plate 160. Because diaphragm 238 is fully supported, it can withstand higher pressure in pressure chamber 190 than an unsupported diaphragm could withstand. This embodiment can therefore have an actuator operating pressure higher than conventional unsupported diaphragms, which may be limited to 150 psig. Furthermore, diaphragm 238 can have an absence of fiber reinforcement and can be thinner than a conventional diaphragm.

Using the same components as previously described, in other embodiments, actuator 100 can be assembled without diaphragm 238. The dual nature of the assembly allows operators to run the actuator as a piston actuator without maintaining a second set of valves and parts. To operate actuator 100 without a diaphragm, a seal ring (not shown) is positioned between housing 112 and cap 130. Sidewall seal 186 of outer plate 166 forms a seal against ID surface 114, thus defining a pressure chamber without the use of a diaphragm. Plate 160 can be a monolithic plate, or can be an assembly of hub 164 and annular outer plate 166. As with other configurations, pressure media through inlet 140 urges plate 160 downward, thus causing valve stem 106 to move downward.

Down stop 244 is a cylindrical member for transmitting axial force between plate 160 and valve stem 106. Down stop 244 includes cylindrical body 246 and shoulder 248 extending therefrom. The upward facing surface of shoulder 248 contacts the downward facing surface of plate 160. Nipple 250 extends axially from the upper end of down stop 244. When actuator 100 is assembled, nipple 250 is positioned in bore 218, thus concentrically aligning both members.

The lower end of down stop 244 includes threaded bore 252, which has threads on an ID surface, for threadingly engaging a threaded end of valve stem 106. As one of skill in the art will appreciate, the connection between down stop 244 and valve stem 106 can be any of various types of connections and is not limited to threaded connections. The outer diameter of the lower end of down stop 244 includes threaded collar 254 and can include any number of spacer rings 256. Threaded collar 254 contacts another member, such as packing retainer 108, located at the lower end of housing 112, to stop the further downward travel of down stop 244. Threaded collar 254 is adjusted so that it stops downward movement, and thus valve stem 106, at the appropriate position to completely open or completely close valve 102. Spacer rings 256 can be added or removed so that an opening of the gate (not shown) of gate valve 102 is properly aligned with a passage (not shown) of gate valve 102. A set screw can be used to hold threaded collar 254 in position.

Spring 262 surrounds down stop 244 and at least a portion of valve stem 106, and generally extends from the top of bonnet 104 to the downward facing surface of shoulder 248. Spring 262 is compressed as plate 160 moves from the upper position to the lower position. When fluid pressure from inlet 140 is reduced, spring 262 urges plate 160 up, away from valve 102. As one of skill in the art will appreciate, fluid force within valve 102 can act on valve stem 106 inside of valve 102 to urge valve stem 106 upward. Spring 262 and the upward force on the valve stem 106 can work together or independently to move plate 160 up.

Figure 2:
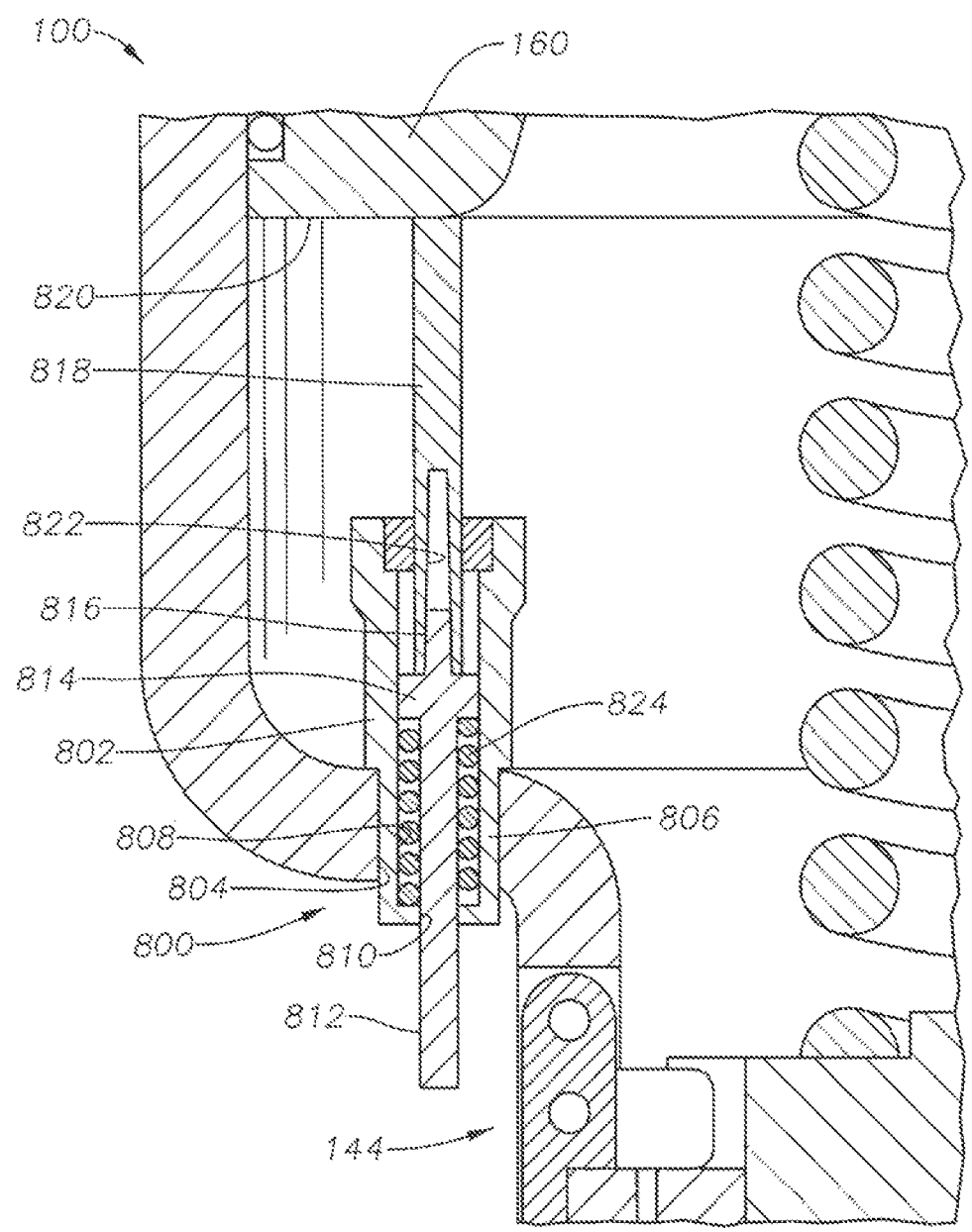
FIG. 2 is an enlarged side sectional view of the indicator stem of FIG. 1.

Referring now to FIG. 2, indicator assembly 800 indicates the position of plate 160. Indicator housing 802 is a cylindrical housing positioned in indicator orifice 804. Indicator orifice 804 is an opening in a downward facing surface of actuator housing 112, axially below a portion of plate 160. Indicator housing 802 has a generally cylindrical shape with a connector 806, such as threads, on an outer diameter surface. Connector 806 is positioned in and connected to orifice 804. Indicator housing 802 also includes a cylindrical bore therethrough, defined by ID 808. Shoulder 810 is an annular shoulder at the lower end of indicator housing 802, defining an inner diameter that is smaller than the ID 808.

Indicator stem 812 is a cylindrical shaft protruding from the orifice defined by shoulder 810. Rib 814 is an annular shoulder protruding from the outer diameter of indicator stem 812. Rib 814 has an outer diameter that is about the same or slightly less than the inner diameter of ID 808, but is greater than the inner diameter of the orifice defined by shoulder 810. The portion of indicator stem 812 above rib 814 is defined as connector end 816. Connector end 816 can be smooth, have threads, or have other features to facilitate connection to another member.

Indicator shaft 818 is a cylindrical shaft extending from indicator stem 812 to a downward facing surface 820 of plate 160. Downward facing surface 820 is part of an indicator side of plate 160 that is opposite the pressure side of plate 160 and faces the valve end of housing 112. Indicator shaft 818 can have a coupling 822 for connecting to connector end 816 of indicator stem 812. Coupling 822 can be, for example, a cylindrical bore or a threaded connector. The upper end of indicator shaft 818 can be in contact with surface 820 of plate 160, but is not connected to surface 820 of plate 160 (FIG. 1-2). While the plate 160 is in the upper position, the upper end of indicator shaft 818 is below plate 160 and not touching plate 160 (FIG. 3).

Spring 824 is a spring in ID 808 that is concentric with a portion of indicator stem 812. The lower end of spring 824 is in contact with shoulder 810. The upper end of spring 824 is in contact with rib 814. Spring 824, thus, urges indicator stem 812 upward, which in turn urges indicator shaft 818 upward. Stem 812 and shaft 818 move upward until shaft 818 contacts downward facing surface 820. When actuator 100 is actuated and plate 160 moves from the upper position to the lower position, indicator stem 812 is urged downward by way of indicator shaft 818. Indicator stem 812, thus, moves between a plate-up position and a plate-down position, with indicator stem 812 protruding further from housing 112 in the plate-down position than in the plate-up position. When plate 160 moves back up to the upper position, spring 824 urges indicator stem 812 upward, to the extent permitted by indicator shaft 818 in contact with plate 160, so that indicator stem 812 moves to the plate-up position as plate 160 moves to the upper position.

The lengths of each indicator shaft 818 and indicator stem 812 can be preselected so that the end indicator stem 812 is flush with or protrudes slightly below shoulder 810 in the plate-up position, and so that rib 814 does not contact shoulder 810 when indicator stem 812 is in the plate down position.

Embodiments can include a rotational lock 144 that prevents rotation of housing 112 relative to bonnet 104 or is otherwise used to maintain the connection between housing 112 and bonnet 104. A portion of indicator stem 812 can be located radially outward from and axially aligned with rotational lock 144 when indicator stem 812 is in the plate-down position, as shown in FIGS. 1 and 2. Therefore, in the plate-down position, indicator stem 812 prevents rotational lock 144 from moving to an unlatched position. Latch body 146 (FIG. 5) would bump into indicator stem 812 when pivoting outward, preventing latch body 146 from being in an unlatched position. Alternatively, indicator stem 812 obstructs access to rotational lock 144 in the plate-down position. In the plate-up position, indicator stem 812 does not prevent access to or obstruct rotational lock 144. When indicator stem 812 is in the plate-up position, as shown in FIG. 3, the end of indicator stem 812 is axially above rotational lock 144. Therefore, indicator stem 812 can be used to prevent or deter unlatching rotational lock 144 when plate 160 is in a down position.

Because orifice 804 is through a lower end of housing 112, orifice 804 is spaced apart from, and not in communication with, pressure chamber 190. The lower end of housing 112, below plate 160 can, for example, be at atmospheric pressure and can have ports (not shown) to expel air below the diaphragm 238 as the diaphragm moves downwards. Therefore, indicator stem 812 does not create a leak path wherein pressure media can escape from pressure chamber 190. Indeed, in embodiments having a diaphragm 238, there are no dynamic seals required to retain pressure in pressure chamber 190. Rather, each of the seals is a static seal. In embodiments having a piston, rather than a diaphragm, the seal or seals between the piston and housing 112 is the only dynamic seal. The reduction in number of dynamic seals, or the elimination of dynamic seals, to retain pressure media in pressure chamber 190 means that leaks are less likely to occur.

In operation, diaphragm 238 is pressed between, and sealingly engages, surface 208 and plate 160, thus preventing pressurized media from leaking therebetween. In embodiments, shoulder 206 and diaphragm 238, or an annular seal (not shown) between diaphragm 238 and plate 160 form a seal and, thus, prevent pressurized media from contacting central bore 162 of plate 160. In such embodiments, no seal is required between seal nut 194 and bore 162. As one of skill in the art will appreciate, if a seal is used between seal nut 194 and bore 162, such a seal will be redundant to the seal between seal nut 194 and diaphragm 238.

Pressurized media is introduced through inlet 140 into pressure chamber 190. The pressurized media exerts downward force on diaphragm 238 and plate 160, which urges plate 160, down stop 244, and valve stem 106 downward to actuate valve 102. As plate 160 moves downward from the upper position position (FIG. 3) to the lower position (FIG. 1), it urges indicator shaft 818 downward. Indicator stem 812, being connected to indicator shaft 818, is thus urged from the plate-up position (FIG. 3) downward to the plate-down position (FIG. 1) such that more of indicator stem 812 protrudes through orifice 804 in the plate-down position. From the exterior of actuator 100, the extension and retraction of stem 812 provides a visual indication of the position of plate 160 and, thus, the state of valve 102. When the pressure of pressurized media is reduced, plate 160 moves from the plate-down position back to the plate-up position. As plate 160 moves, spring 824 urges stem 812 upward.

In embodiments, one or more indicator assemblies 800 can be spaced apart around housing 112. In embodiments, all or a portion of stem 812 can be pushed upward to urge plate 160 upward. In embodiments, indicator shaft 818 can be connected to plate 160 such that pulling downward on indicator shaft 818 urges plate 160 downward. Stem 812 can be configured to be urged downward by an operator such as, for example, by use of jack screws or a connection point to which a tool can be attached.

While the invention has been shown or described in only some of its forms, it should be apparent to those skilled in the art that it is not so limited, but is susceptible to various changes without departing from the scope of the invention.

What is claimed is:

1. An apparatus for actuating a valve, the apparatus comprising:
   a housing having an axis, a valve end, a cap end, and a cylindrical sidewall defining an inner diameter surface of the housing;
   a cap connected to the cap end of the housing;
   an inlet located in one of the cap and the housing;
   a plate positioned within the housing, the plate having a center portion and an outer diameter that slidingly engages the inner diameter surface of the housing, the plate moving between an extended position and a retracted position in response to pressure media from the inlet, the plate being nearer the valve end in the extended position than in the retracted position;
   a down stop in contact with the plate, the down stop being urged toward the valve end of the housing when the plate moves toward the extended position, and the down stop being operable to be connected to a valve stem for actuating the valve;
   a seal nut with a first end in engagement with the down stop, the seal nut having a second end with an end surface, the end surface being spaced apart from the cap when the plate is in the extended position; and
   an indicator stem protruding through the housing, the indicator stem being in a plate-up position when the plate is in the retracted position, and the indicator stem being in a plate-down position and preventing a latch mechanism from moving to an unlatched position to prevent the housing from being detached from a bonnet when the plate is in the extended position.

2. The apparatus of claim 1, further comprising:
   an orifice in a surface of the housing proximate to the valve end of the housing and offset from the axis of the housing; and wherein
   the indicator stem is parallel to, and offset from, the axis of the housing and protrudes through the orifice, the indicator stem having an end for selective engagement with a surface of the plate that faces the valve end of the housing.

3. The apparatus of claim 1, wherein the indicator stem is biased towards a surface of the plate, the indicator stem moving between the plate-up position and the plate-down position in response to movement of the plate between the extended position and the retracted position.

4. The apparatus of claim 2, further comprising:
   an indicator housing located in the orifice, the indicator housing having an annular housing shoulder;
   a rib protruding from an outer diameter of the indicator stem; and
   a spring located concentric with a portion of the indicator stem, a first end of the spring engaging the housing shoulder and a second end of the spring engaging the rib, biasing the indicator stem towards the surface of the plate that faces the valve end of the housing.

5. The apparatus of claim 1, wherein the bonnet is selectively connected to the valve, the valve stem passing through the bonnet, the housing being detachably connectable to the bonnet by engaging the bonnet and rotating the housing from a released position to a locked position, the housing rotating less than one full revolution between the released and locked positions.

6. The apparatus of claim 1, wherein:
   the bonnet is detachably connected to the housing and selectively connected to the valve, the valve stem passing through the bonnet; and
   the apparatus further comprises a rotational lock, the rotational lock preventing the housing from rotating relative to the bonnet when the housing is in a locked position.

7. The apparatus of claim 6, further comprising:
   an orifice in a surface of the housing proximate to the valve end of the housing; and wherein
   the indicator stem protrudes through the orifice, the indicator stem having a first end in engagement with a surface of the plate facing the valve end of the housing and a second end located exterior of the housing radially outward from and axially aligned with the rotational lock, relative to the axis of the housing, when the plate is in the extended position.

8. The apparatus of claim 1, wherein:
   the bonnet is detachably connected to the housing and selectively connected to the valve, the valve stem passing through the bonnet;
   the apparatus further comprises a latch body connected to the housing, the latch body preventing the housing from rotating relative to the bonnet when the latch body is in a latched position;
   the indicator stem protrudes through the housing proximate to the valve end of the housing; and
   the indicator stem prevents the latch body from moving to an unlatched position when the indicator stem is in the plate-down position.

9. The apparatus of claim 1, further comprising a diaphragm covering the plate and extending to the cap end, the diaphragm and the cap defining a pressure chamber, and wherein an inner diameter orifice of the diaphragm is engaged by the seal nut.

10. The apparatus of claim 1, wherein the plate comprises a convex surface and a concave surface, each of the convex and concave surfaces facing the cap and the concave surface being spaced radially outward from the convex surface, and wherein the outer diameter of the plate is located axially nearer the valve end of the housing than the center portion.

11. The apparatus of claim 10, further comprising a diaphragm, the diaphragm being in contact with each of the convex and concave surfaces when the plate is in the extended position.

12. The apparatus of claim 1, wherein the inlet is offset from the axis of the housing.

13. The apparatus of claim 1, wherein a central portion of the cap on the axis is free of an aperture.

14. An apparatus for actuating a valve, the apparatus comprising:
   a housing having an axis, a valve end, a cap end, and a cylindrical sidewall defining an inner diameter surface of the housing;
   a plate positioned within the housing, the plate moving between an extended position and a retracted position in response to pressure media applied within the housing on a pressure side of the plate, the plate being nearer the valve end in the extended position than in the retracted position;
   a latch body connected to the housing, the latch body preventing the housing from disconnecting from a bonnet when the latch body is in a latched position; and an indicator stem protruding from the housing and located axially offset from the axis of the housing, the indicator stem selectively engaging an indicator side of the plate that is opposite the pressure side of the plate, the indicator stem moving between a plate-up position and a plate-down position in response to movement of the plate between the extended position and the retracted position, the indicator stem preventing the latch body from moving from the latched position to an unlatched position when the indicator stem is in the plate-down position.

15. The apparatus of claim 14, wherein the indicator stem is biased towards the plate.

16. The apparatus of claim 14, wherein the indicator stem is located in an atmospheric pressure portion of the housing.

17. An apparatus for actuating a valve, the apparatus comprising:
- a housing having an axis, a valve end, a cap end, and a cylindrical sidewall defining an inner diameter surface of the housing;
- a cap connected to the cap end of the housing;
- a plate positioned within the housing, the plate moving between an extended position and a retracted position in response to pressure media applied within the housing on a pressure side of the plate, the plate being nearer the valve end in the extended position than in the retracted position;
- a bonnet detachably connected to the housing and operable to be connected to the valve;
- a latch body connected to the housing, the latch body preventing the housing from rotating relative to the bonnet when the latch body is in a latched position;
- an orifice in a surface of the housing proximate to the valve end of the housing and axially offset from the axis of the housing; and
- an indicator stem protruding through the orifice, the indicator stem having a first end in engagement with a surface of the plate facing the valve end of the housing and a second end located exterior of the housing radially outward from and axially aligned with the latch body, relative to the axis of the housing, when the plate is in the extended position; wherein the indicator stem prevents the latch body from moving to an unlatched position when the plate is in the extended position.

18. The apparatus of claim 17, further comprising:
- an indicator housing located in the orifice, the indicator housing having an annular housing shoulder;
- a rib protruding from an outer diameter of the indicator stem; and
- a spring located concentric with a portion of the indicator stem, a first end of the spring engaging the housing shoulder and a second end of the spring engaging the rib, biasing the indicator stem towards the surface of the plate.

19. The apparatus of claim 17, wherein the housing is detachably connectable to the bonnet by engaging the bonnet and rotating the housing from a released position to a locked position, the housing rotating less than one full revolution between the released and locked positions.

* * * * *